United States Patent
Vajaria et al.

(10) Patent No.: US 9,569,834 B2
(45) Date of Patent: Feb. 14, 2017

(54) AUTOMATED IMAGE-BASED PROCESS MONITORING AND CONTROL

(71) Applicant: KLA-TENCOR CORPORATION, Milpitas, CA (US)

(72) Inventors: Himanshu Vajaria, San Jose, CA (US); Shabnam Ghadar, Milpitas, CA (US); Tommaso Torelli, Berkeley, CA (US); Bradley Ries, San Jose, CA (US); Mohan Mahadevan, Santa Clara, CA (US); Stilian Pandev, Santa Clara, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 14/746,820

(22) Filed: Jun. 22, 2015

(65) Prior Publication Data
US 2016/0371826 A1    Dec. 22, 2016

(51) Int. Cl.
G06K 9/00    (2006.01)
G06T 7/00    (2006.01)

(52) U.S. Cl.
CPC ......... *G06T 7/0004* (2013.01); *G06T 7/0087* (2013.01); *G06T 2207/10024* (2013.01); *G06T 2207/30148* (2013.01)

(58) Field of Classification Search
CPC .............................. G06T 7/0004; G06T 7/0087
USPC .......................................................... 382/144
See application file for complete search history.

(56) References Cited

U.S. PATENT DOCUMENTS

| | | | |
|---|---|---|---|
| 2008/0187212 A1* | 8/2008 | Obara | G06T 7/001 382/149 |
| 2009/0290782 A1 | 11/2009 | Regensburger | |
| 2010/0182602 A1* | 7/2010 | Urano | G01N 21/4738 356/369 |
| 2010/0235134 A1 | 9/2010 | Xiong | |
| 2012/0057773 A1 | 3/2012 | Langmatz et al. | |
| 2013/0163851 A1 | 6/2013 | Dalla-Torre et al. | |
| 2013/0188859 A1 | 7/2013 | Luo et al. | |

* cited by examiner

*Primary Examiner* — Ruiping Li
(74) *Attorney, Agent, or Firm* — Hodgson Russ LLP (57) ABSTRACT

Methods and devices are disclosed for automated detection of a status of wafer fabrication process based on images. The methods advantageously use segment masks to enhance the signal-to-noise ratio of the images. Metrics are then calculated for the segment mask variations in order to determine one or more combinations of segment masks and metrics that are predictive of a process non-compliance. A model can be generated as a result of the process. In another embodiment, a method uses a model to monitor a process for compliance.

12 Claims, 9 Drawing Sheets

- Metrics (Intensity based segment masks)

- Metrics (SD based segment masks)

- Metrics (PCA based segment masks)

Fig. 8

| | Description of Metric |
|---|---|
| 1 | Mean of Thresholded Masked Die (0-50%) |
| 2 | SD of Thresholded Masked Die (0-50%) |
| 3 | Mean of Thresholded Masked Die (%50-100%) |
| 4 | SD of Thresholded Masked Die (%50-100%) |
| 5 | Mean of the X-Directed Masked Gradient Image (3x3 Horizontal Sobel Filter) |
| 6 | Mean of the Y-Directed Masked Gradient Image (3x3 Vertical Sobel Filter) |
| 7 | SD of the X-Directed Masked Gradient Image (3x3 Horizontal Sobel Filter) |
| 8 | SD of the Y-Directed Masked Gradient Image (3x3 Vertical Sobel Filter) |
| 9 | Mean of the X-Directed Masked Gradient Image (5x5 Horizontal Sobel Filter) |
| 10 | Mean of the Y-Directed Masked Gradient Image (5x5 Vertical Sobel Filter) |
| 11 | SD of the X-Directed Masked Gradient Image (5x5 Horizontal Sobel Filter) |
| 12 | SD of the Y-Directed Masked Gradient Image (5x5 Vertical Sobel Filter) |
| 13 | Mean of Masked the Die |
| 14 | SD of the Masked Die |

AUTOMATED IMAGE-BASED PROCESS MONITORING AND CONTROL

FIELD OF THE DISCLOSURE

The disclosure relates to monitoring and control of wafer manufacturing processes.

BACKGROUND OF THE DISCLOSURE

Semiconductor devices such as logic and memory devices are typically fabricated by a sequence of processing steps applied to a substrate or wafer. The various features and multiple structural levels of the semiconductor devices are formed by these processing steps. For example, lithography is a semiconductor fabrication process that involves generating a pattern on a semiconductor wafer. Additional examples of semiconductor fabrication processes include, but are not limited to, chemical-mechanical polishing (CMP), etch, deposition, and ion implantation. Multiple semiconductor devices may be fabricated on a single semiconductor wafer and then separated into individual semiconductor devices.

Inspection processes are used at various steps during a semiconductor manufacturing process to detect defects on wafers to promote higher yield. As design rules and process windows continue to shrink in size, inspection systems are required to capture a wider range of physical defects on wafer surfaces while maintaining high throughput.

Wafer manufacturing process control is typically performed based on low wafer sampling using a slow, but sensitive, inspection tool, followed by review using a scanning electron microscope (SEM). In some cases, process monitoring and control is achieved by way of a learning-based method where a process engineer learns how long the process tool can be used before requiring maintenance. This process engineer-based approach is prone to random failures since there is no in-line feedback. In both of these previous techniques, issues are only detected once a process tool has become problematic and creates defects that can be observed on inspection. Additionally, these techniques are slow, and therefore, wafer sampling is low.

Previous high-throughput approaches lack sensitivity and versatility. For example, previous techniques may detect known patterns in pre-defined zones on a wafer.

Accordingly, there is a need for high-throughput process monitoring and control that is capable of detecting non-compliance based on previously unknown patterns.

BRIEF SUMMARY OF THE DISCLOSURE

The present disclosure provides automated process control monitoring through customized analysis and classification of multi-spectral, multi-perspective wafer level and lot level information. In this way, high-throughput monitoring of process for lithography, chemical-mechanical planarization (CMP), films and other semiconductor manufacturing modules may be achieved. The disclosed technique can be used to provide in-line process control monitoring. Another application for the disclosed techniques is to provide intelligent sampling for slower but higher resolution characterization tools within a fab. Traditionally, random sampling is used to study process drift and control. Due to the high throughput enabled by embodiments of the present disclosure, random sampling can be replaced with intelligent sampling to monitor process drift.

In a method, die, field, and/or wafer level images are automatically segmented to enhance signal to noise. Signal metrics are then computed across segments within the die/field/wafer. And the resulting single wafer/single lot/multiple lot information is combined for robustness. In an embodiment, a model building engine can consume single or multi-scan, channel, wafer, and lot information to determine process tool status.

In an embodiment, a device is provided for detecting process status (i.e., compliance or non-compliance). Methods and devices of the present disclosure can advantageously use inspection imaging already captured by process modules.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 2:
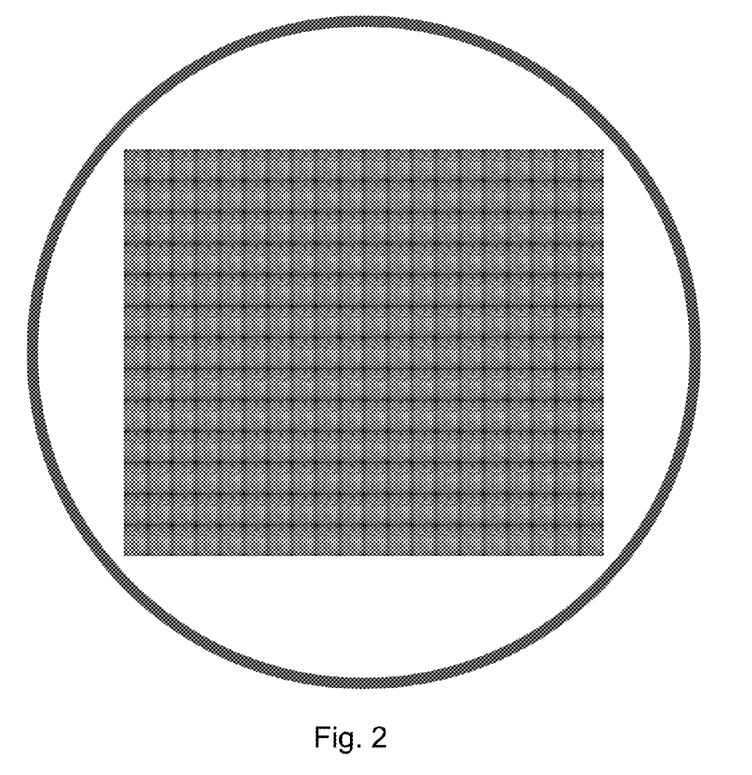
FIG. 2 is a macro debug image of a wafer, wherein the wafer includes a set of dies.

The present disclosure may be embodied as a method 100 for generating a model for detecting process non-compliance. The method 100 comprises receiving 103 a plurality of wafer images (see, e.g., FIG. 2). The received 103 wafer images may be images of the same wafer, where each image is captured using a different modality such as, for example, bright field illumination, dark field illumination, polarized light, red light, blue light, green light, white light, etc., or combinations. In other embodiments, the received 103 wafer images may be images of different wafers. In other embodiments, the wafer images comprise both images of the same wafer and images of different wafers. Each received 103 wafer image includes a set of images of the dies (see, e.g., FIG. 3).

For each received 103 wafer image, the inspection results of each die are received 106. As such, for a wafer, a wafer image is received 103, and a set of inspection results is received 106, where each inspection result of the set corresponds to a die of the set of dies for the wafer. The received 106 inspection results may be a simple pass/fail indication for each die. In other embodiments, the received 106 inspection results may indicate pass or fail, and further indicate one or more reasons for the failure. For example, for a lithography module (a production tool used for lithography), a die may fail due to alignment, fidelity, focus, reticle tilt, critical dimension, overlay, particles, etc. In a CMP module, failure may be due to polishing defects, contamination, scratches, etc. In a deposition module, failure may be due to alignment, contamination, film thickness, etc. Other failure types are known and can be incorporated. As such, the method 100 may be used to generate a classification model having multiple classes (e.g., pass, alignment failure, or scratched—a three-class model). In general, this model can also be of the regression type where a discrete model can be replaced with a continuous model.

While the method 100 may be used to detect problems once they have occurred, the model may also be used to detect impending signs of problems before they occur. The method 100 is not specific to any single class of process problems. Embodiments of the present technique have a universality such that the technique can be applied across any or all process modules in a fab.

Figure 1:
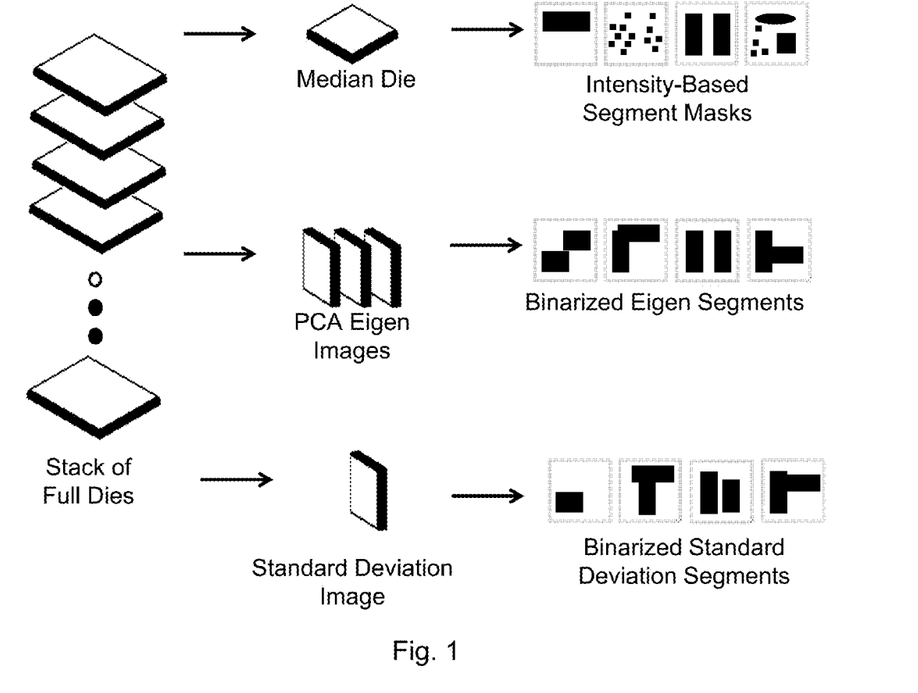
FIG. 1 is a diagrammatic view of a method according to the present disclosure.
Figure 10:
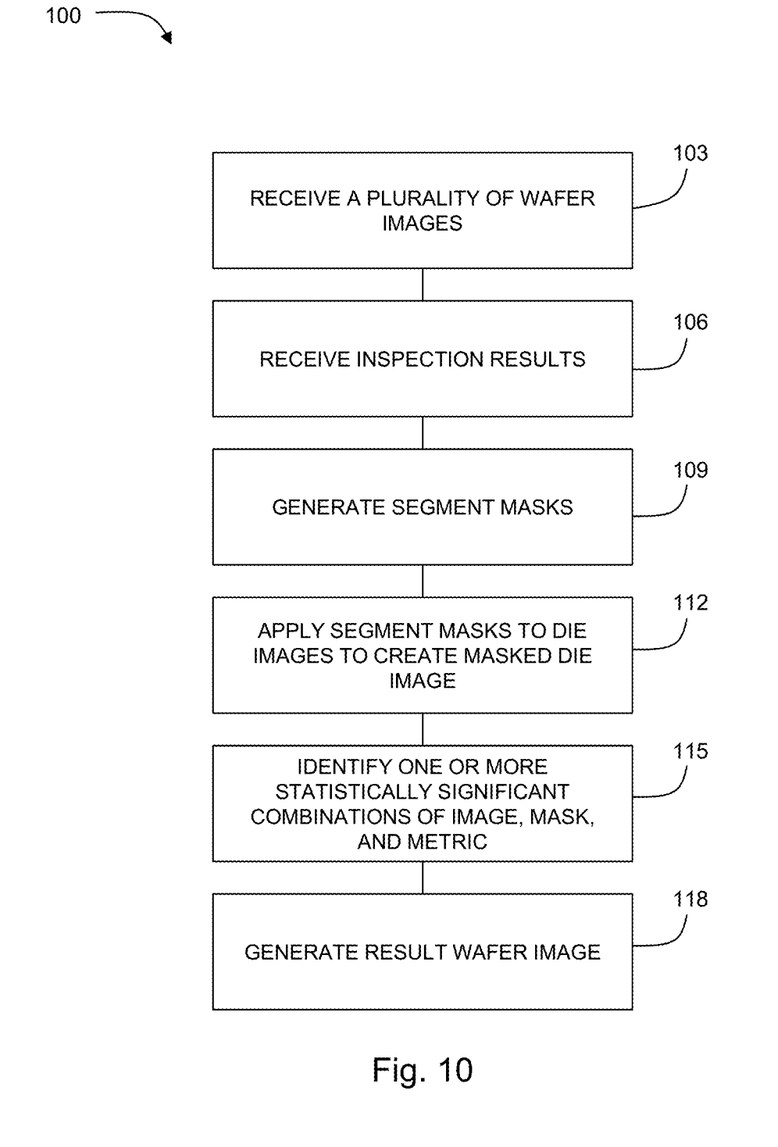
FIG. 10 is a chart showing a method according to an embodiment of the present disclosure.

The method 100 comprises generating 109 segment masks based on the die images of each set of die images (see, e.g., FIGS. 1 and 10). Segment masks allow each image (wafer and/or die) to be masked to show only the portion of the image having potentially useful information (i.e., signal) while masking information that is potentially less useful (i.e., noise). It should be noted that different structures in the die are capable of carrying different levels of process information. Significant amounts of process information are hidden in the data as these structures are inspected with the combinations of optical parameters. This rich process information can be extracted by applying the types of analysis disclosed herein. An aspect of this analysis is the segmentation of the different kinds of structures in the die into various groups. The signal is accumulated within each group to further enhance the signal to noise ratio. Each generated 109 segment mask is based on a segmentation type. Each segmentation type provides the potential of enhancing the signal-to-noise ratio.

Figure 3:
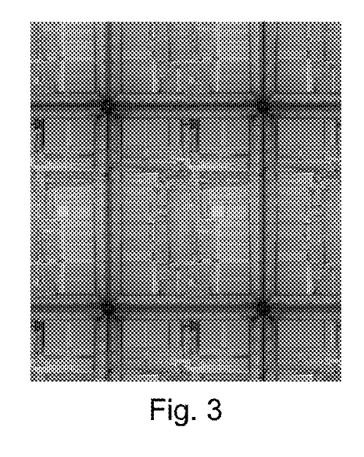
FIG. 3 depicts a median die and portions of surrounding dies.
Figure 4:
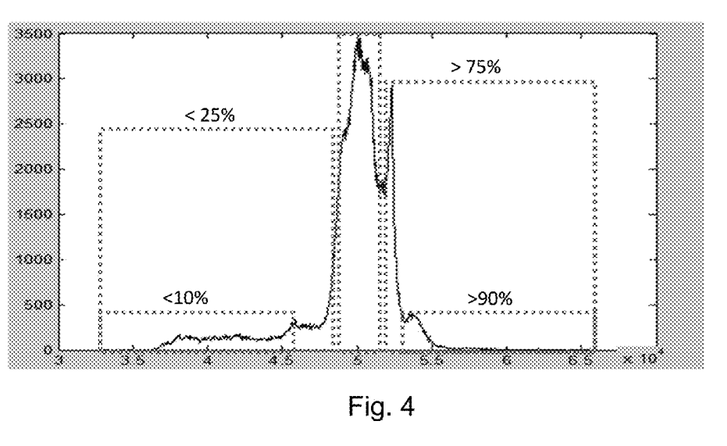
FIG. 4 is an intensity histogram of a median die.
Figure 5:
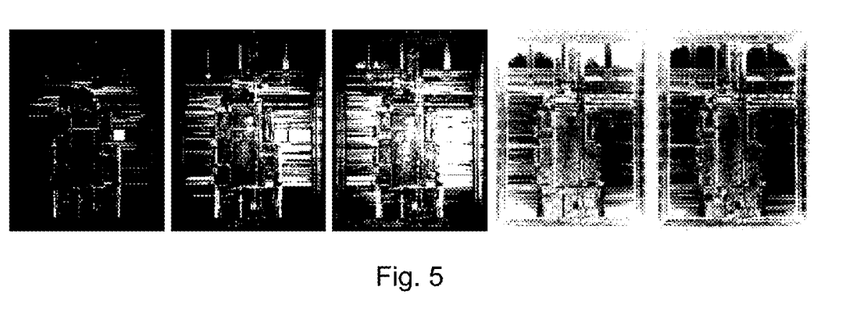
FIG. 5 illustrates five intensity-based segment masks.

An exemplary segmentation type is an intensity-based mask. An intensity-based mask may be determined by first identifying a die having a mean intensity—the "mean die" (FIG. 3). Next, an intensity histogram of the mean die is determined and used to derive at least one threshold intensity value (FIG. 4). There are a variety of intensity segmentation schemes. An exemplary fixed segmentation scheme could be as shown below. Other dynamic schemes can adapt naturally to the density and response of the structures. In an example of a fixed scheme, the threshold value may be set to mask the 25% of pixels with the lowest intensities, or the 25% of pixels with the greatest intensities. In an exemplary embodiment illustrated in FIG. 5, five intensity-based segment masks are generated 109 by setting threshold values at <10% (the ten percent of pixels with the lowest intensities), <25%, 50%, >75%, and >90% (the ten percent of pixels with the highest intensities). In another embodiment, the threshold values are set based on 10%, 30%, 50%, 70%, and 90% intensities. It should be noted that other intensity values may be used as thresholds and that masks may be set to be greater than or less than a threshold, according to the desired result. (Note that FIGS. 2-6 and 7-8 are images generated solely to illustrate embodiments of the present disclosure and are not actual data).

Figure 6:
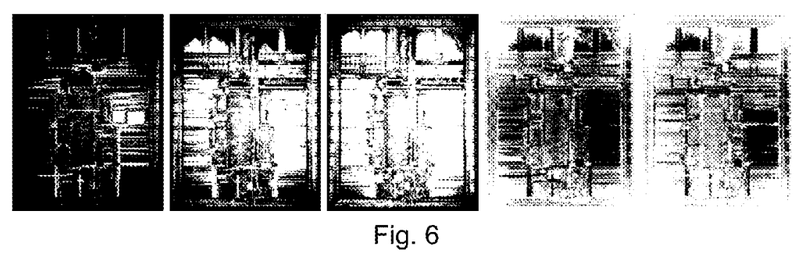
FIG. 6 illustrates five standard deviation-based segment masks.

In another segmentation type illustrated in FIG. 6, threshold values are selected based on standard deviation. For example, a threshold value may be set at one standard deviation ($1\sigma$) below a selected value, such as a histogram peak value of the mean die. In a particular example, masks are generated 109 at threshold values set to $\pm 2\sigma$ and $\pm 1\sigma$—resulting in four segment masks.

Figure 7:
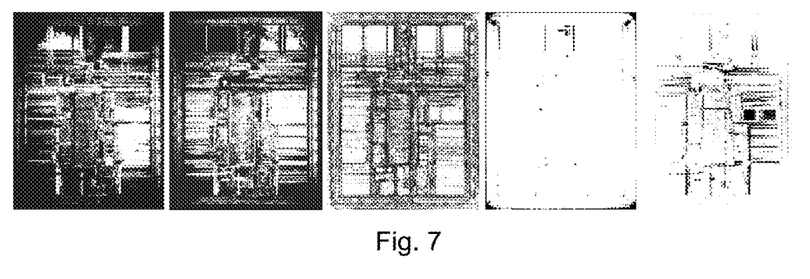
FIG. 7 illustrates five principal component-based segment masks.

In another segmentation type illustrated in FIG. 7, mask threshold values are selected based on a principal component analysis (PCA). A median die image is selected, and the image values are subtracted from each other die image of the set of die images. In this way, a "difference die" image is created for each die. A PCA of these difference dies provides masks, where each mask corresponds with each principal component (eigenvector) resulting from the PCA providing a threshold value for a different mask. The number of eigenvectors (and therefore the number of resulting masks) can be selected according to the particular application, as is known in the art. In an exemplary embodiment, the first five principal components are selected. In this way, the masks capture regions with high variance across dies.

While some of the above examples use a mean die image, for example, to create a difference die image or to threshold a histogram, it should be noted that embodiments may alternatively or additionally use a reference die image.

As stated above, each segmentation type may be selected in an attempt to enhance the signal-to-noise ratio. For example, it may be determined that in a particular process and with a particular wafer configuration (perhaps having large structures), an intensity-based mask provides a beneficial improvement in signal-to-noise ratio, while the intensity-based mask may not be useful for the same process acting on a different patterned wafer (perhaps having fine structures). Other segmentation types can be used to create masks and will be apparent in light of the present disclosure. For example, other automatic thresholding techniques may be more appropriately used to generate 109 a segment mask where a histogram results in a bimodal distribution.

Each generated 109 segment mask is then applied 112 to each die image such that a masked die image is created. A set of metrics is calculated for each masked die image (i.e., for each masked region). Any one or more metrics may be selected as appropriate to an application. Metrics may be provided for one or more of intensity, x,y symmetry, radial symmetry, angular symmetry, frequency, or otherwise. And multiple metrics may be calculated for each of these categories. For example, for a metric may be calculated as the mean of the thresholded masked die image (0-50%). And another mean may be calculated of the thresholded masked die image (50-100%). Another metric may be a standard deviation of the thresholded masked die image from 0-50% and another thresholded 50-100%.

Other examples of metrics include (see also FIG. 9):
Mean of the x-directed masked gradient image using a 3×3 horizontal Sobel filter.
Mean of the y-directed masked gradient image using a 3×3 horizontal Sobel filter.
Standard deviation of the x-directed masked gradient image using a 3×3 horizontal Sobel filter.
Standard deviation of the y-directed masked gradient image using a 3×3 horizontal Sobel filter.
Mean of the x-directed masked gradient image using a 5×5 horizontal Sobel filter.
Mean of the y-directed masked gradient image using a 5×5 horizontal Sobel filter.
Standard deviation of the x-directed masked gradient image using a 5×5 horizontal Sobel filter.
Standard deviation of the y-directed masked gradient image using a 5×5 horizontal Sobel filter.

It should be noted that the above list of metrics is not exhaustive and other metrics are known and can be used. In other embodiments, the segment masks are manually generated 109 by an operator. For example, an operator may manually delineate structures by drawing the segments as desired. This may be beneficial in cases where, for example, there is a priori information regarding certain structures on the die. In some embodiments, the segmentation can be drawn from a rendered CAD model where specific structures are grouped into segments.

A detection model results by identifying 115 one or more statistically significant combinations of metric, segment mask, and wafer image based on the die inspection results. Statistical processes can be used to determine the significant processes. For example, linear regression may be used to determine the relationship between the die inspection results and a combination of metric, segment mask, and wafer image.

Figure 8:
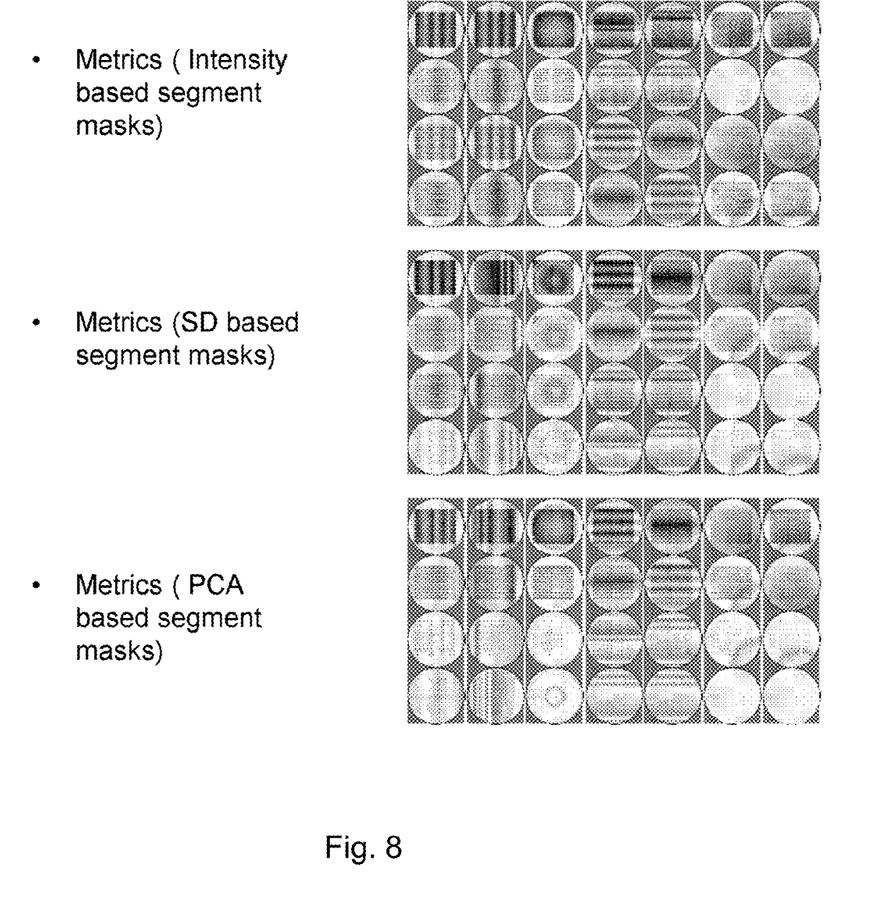
FIG. 8 illustrates an array of resulting wafer images generated for each combination of segment mask (in the rows) and metrics (in the columns)
Figure 9:
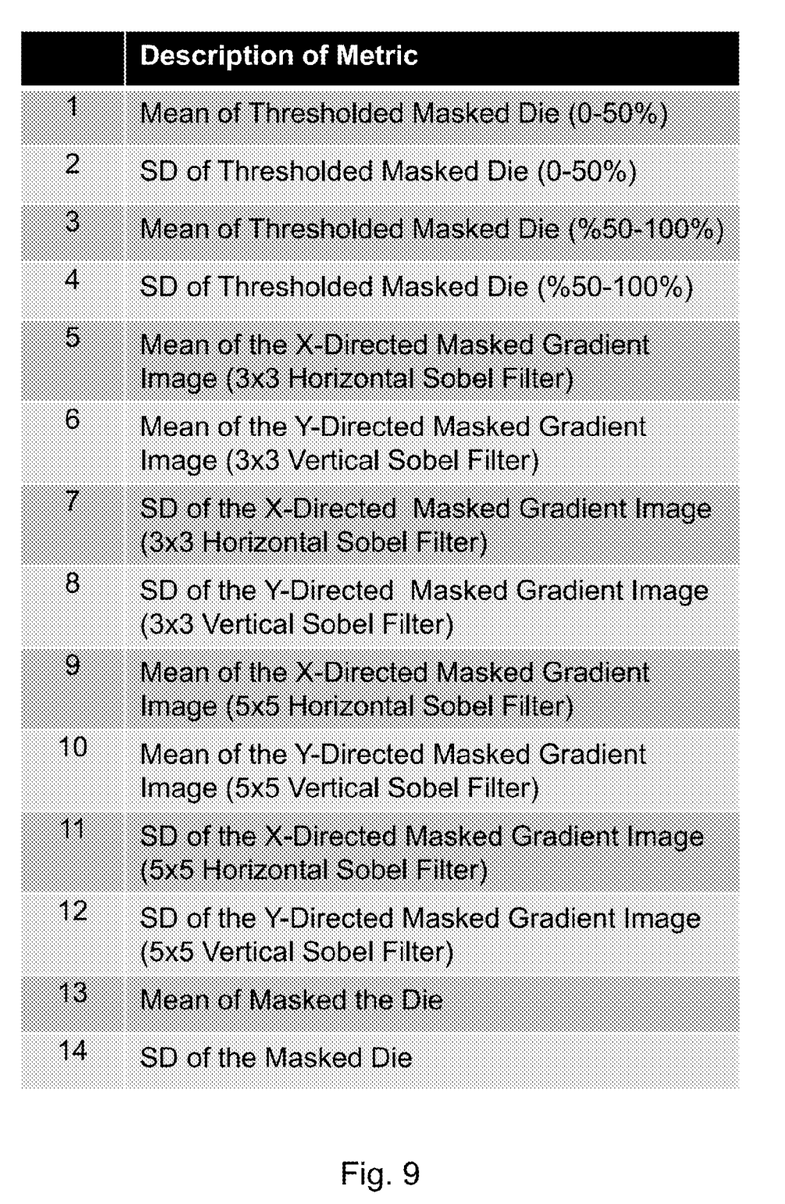
FIG. 9 is a chart showing an exemplary set of metrics calculated for masked die images.

The method 100 may comprise generating 118 a result wafer image for each combination of wafer image, segment mask, and metric. Each generated 118 result wafer image comprises a set of result die images based on the corresponding combination. For example, FIG. 8 depicts wherein a particular wafer image has been segmented in twelve ways—four intensity-based segment masks, four SD-based segment masks, and four PCA-based segment masks. The number of segmented images may be more or less, as discussed above. In turn, fourteen metrics are calculated for each masked wafer image as shown in FIG. 9. Result wafer images are generated 118 for each combination. It can be seen in FIG. 8 that certain result wafer images may depict variations in the wafer that are different than the variations (or lack thereof) depicted other result images. For example, the result image at row 1, column 5 (corresponding to an intensity-based segment mask combined with a mean of the x-directed masked gradient image (using a 3×3 horizontal Sobel filter)) depicts variations which have a pattern different from the result image in row 10, column 11 (corresponding to a second principal component segment mask combined with a SD of the x-directed masked gradient image (using a 5×5 horizontal Sobel filter)). Such result images depict graphically how combinations may correlate with wafer artifacts, and therefore, potentially useful information process information.

Steps of the method 100 may be repeated for additional wafer images in order to refine the model. For example, the steps may be repeated for additional wafer images having different image modalities (than the image modalities previously used in the method). In this way, the resulting model can be improved where additional statistically significant combinations are found. In another example, the steps may be repeated for additional wafer images with the same modalities of previously-used images—for example, the additional images are images of additional wafers that were not previously used in the method. As such, the resulting model can be improved through the use of additional data points. In this way, a device using the method 100 in a manufacturing environment can continuously improve its detection model.

The method 100 provides techniques for extracting wafer-scale process information that is otherwise lost in a die-to-die analysis. Using the disclosed techniques, information can be extracted from bright-field and dark-field images, and information may be extracted with the pattern (raw image) and/or with the pattern removed (difference image). By integrating information over a segment, the signal-to-noise ratio of the information is enhanced. This enables the detection of weak trends, as such, process module maintenance may be predictive rather than reactive. Predictive module maintenance can save unnecessary maintenance cycles, while also reducing material risk by flagging the need for process tool preventative maintenance prior to a next scheduled maintenance.

Figure 11:
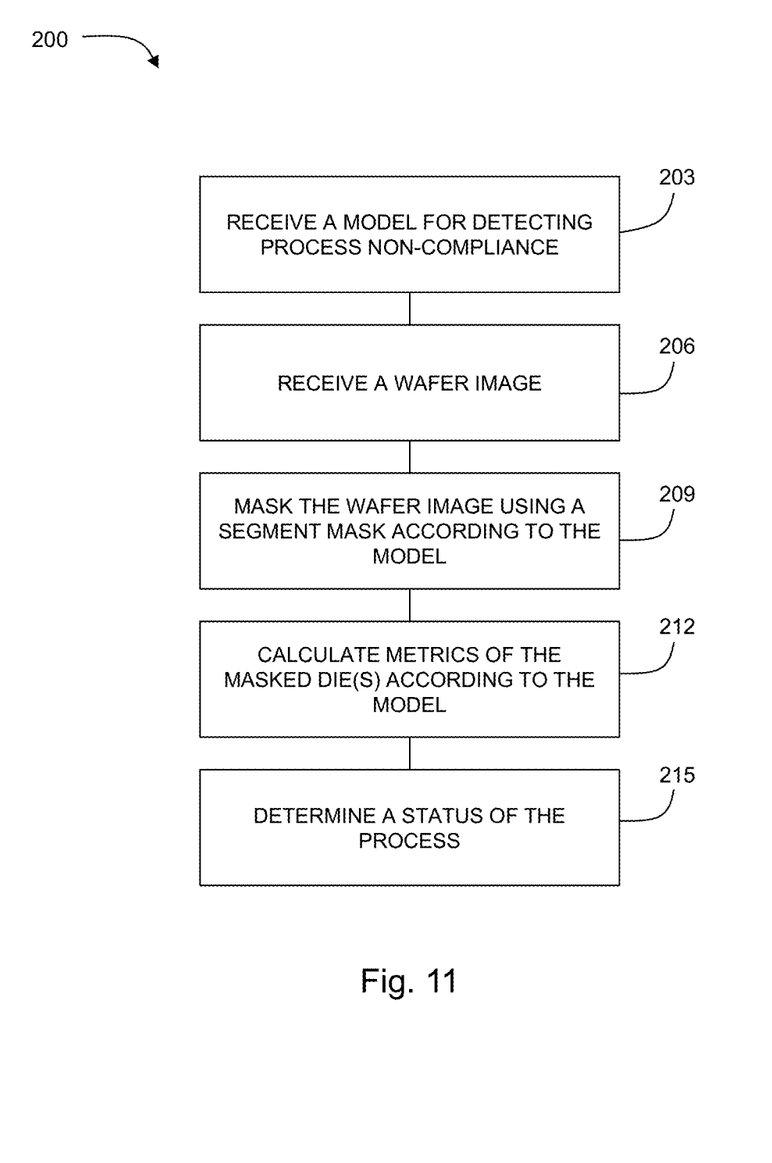
FIG. 11 is a chart showing a method according to another embodiment of the present disclosure.

In another embodiment, such as that depicted in FIG. 11, a method 200 is provided for detecting process non-compliance. The method 200 includes the step of receiving 203 a pre-determined model capable of detecting a process non-compliance. The received 203 model may be, for example, a model generated using the method 100 described above. The received 203 model is based on statistically significant combination(s) of metrics of segment masks, metrics, and wafer images. The ability of the presently disclosed technique to examine this holistically makes it very powerful. Here holistically refers to looking at optical modalities, die structures and algorithmic calculations together. In an embodiment used solely to illustrate the method, a model is received for detecting a process non-compliance, and the model indicates the significant (for the modality of the wafer image) combinations of: (1) a −1σ segment mask and a mean of the thresholded masked die image (0-50%); and (2) a first principal component segment mask and a mean of the y-directed masked gradient image using a 5×5 horizontal Sobel filter.

A wafer image is received 206. The wafer image comprises a set of die images. For example, the wafer image may be received 206 by a computer at a network port. In other cases, a processor receives 206 a wafer image by retrieving the image from storage. In another example, a processor receives 206 a wafer image from a connected camera or other imaging sensor. The wafer image is taken using a imaging modality such as dark-field illumination, bright-field illumination, colored-light illumination (red, blue, green, white, etc.) or other modalities and combinations thereof.

The wafer image is masked 209 using a segment mask of the model. In the illustrative example, the wafer image is masked 209 using a −1σ segment mask and a first principal component segment mask. Metrics of the masked 209 dies are then calculated 212. For the illustrative example, the mean of the thresholded masked die image (0-50%) is calculated for the die image masked 209 with the SD mask, and a mean of the y-directed masked gradient image is calculated 212 for die image masked 209 with the PCA mask. The masking step 209 and the metrics calculation step 212 are repeated for each combination in the model.

The process status (i.e., compliant or non-compliant) is determined 215 based on the calculated 212 metric(s) and the model. Continuing with the illustrative example, the received 203 model may indicate that a process is compliant when the first significant combination (SD-based mask and intensity-based metric) shows a variance across the wafer image of less than a modelled value (N) and the second significant combination (PCA-based mask and gradient-based metric) shows a variance across the wafer of less than a modelled value (M). In some cases, the values of N and M are independent of one another, while in other cases, there may be a relationship where value of N varies according to the value of M.

Figure 12:
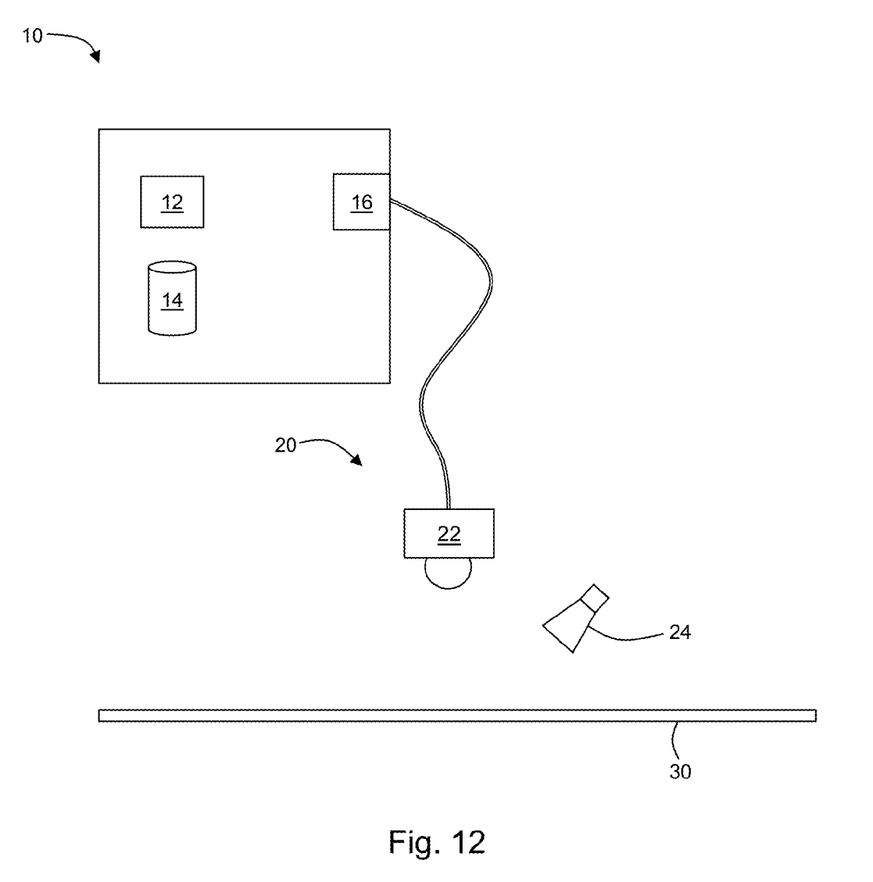
FIG. 12 is a diagram of a device according to an embodiment of the present disclosure.

The present disclosure may be embodied as a device 10 for detecting non-compliance of a process (see, e.g., FIG. 12). The device 10 comprises a processor 12 and a storage device 14 in electronic communication with the processor 12. The device 10 further comprises a communication port 16 in electronic communication with the processor 12. For example, the communication port 16 may be a network port, such as an Ethernet port or a wireless Ethernet port.

In other embodiments, the device 10 may include an imaging device 20, and the communication port 16 may be, for example, a serial interface to the imaging device 20. The imaging device 20 comprises an imaging sensor 22. The imaging sensor 22 may be, for example, a charge-coupled device (CCD) or a time delay and integration (TDI) sensor. The imaging device 20 may further comprise an illumination source 24. The illumination source 24 may be configured as a bright-field source or a dark-field source, as is known in the art. The illumination source 24 may be a broad-spectrum source, such as a white light source, or a more narrow-spectrum source, such as a red light, blue light, or green light source. The imaging device 20 may be configured to capture images using polarized light. The imaging device 20 may comprise more than one illumination sources 24 such that the device 10 may take advantage of images having different modalities. Other imaging modalities and imaging device 20 configurations are known and will be apparent in light of the present disclosure. The imaging device 20 is configured to capture an image of a wafer. For example, the wafer image may be captured while a wafer is being transported through the device 10.

The processor 12 is programmed to perform any of the methods described above. In an example, the processor 12 is programmed to receive a plurality of wafer images of a wafer at the communication port 16. Each wafer image of the plurality of wafer images comprises a set of die images (the dies of the wafer). The processor 12 is further programmed to receive, at the communication port 16, an inspection result of each die of to the sets of die images. As such, for each wafer image of the plurality of wafer images, the processor 12 receives a die inspection result for each die of the wafer.

The processor 12 is programmed to generate a set of segment masks, the segment masks based on the die images of each set of die images and one or more segmentation types. The processor 12 is programmed to apply the segment masks to each die image to create a masked die image. A set of metrics is calculated for each masked die image. The processor 12 is programmed to identify one or more statistically significant combinations of metric, segment mask, and wafer image (i.e., modality) based on the die inspection results. In this way, the processor 12 will generate a model for detecting a process non-compliance based on the identified combinations.

This model can be used as a feedback mechanism to adjust a processing tool, such as a CMP tool or to provide a notification that the processing tool requires maintenance. As such, the processor 12 may send instructions to a processing tool by way of the communication port 16. Additionally or alternatively, the processor 12 may send a maintenance notification signal by way of the communication port 16 or otherwise (e.g., an alarm device, etc.). In some embodiments, the device 10 may comprise a transport stage 30 capable of routing wafers for rework or scrap. In such embodiments, the processor 12 may be programmed to route a wafer for rework or scrap.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A method for generating a model for detecting process non-compliance, comprising:
    receiving a plurality of wafer images, each wafer image of the plurality of wafer images comprising a set of die images;
    receiving an inspection result of each die corresponding to the set of die images;
    generating segment masks based on the die images of each set of die images and one or more segmentation types, wherein each segment mask is configured to mask noise such that only a portion of one of the die images is shown;
    applying, using a processor, each segment mask to each die image to create a masked die image, and calculating a set of metrics for each masked die image; and
    identifying, using the processor, one or more statistically significant combinations of metric, segment mask, and wafer image, based on the die inspection results to generate a detection model.

2. The method of claim 1, further comprising generating, using the processor, a result wafer image for each combination of wafer image, segment mask, and metric, wherein each result wafer image comprises a set of result die images based on the corresponding combination.

3. The method of claim 1, wherein the one or more segmentation types includes determining a median die based on intensity of the die images and thresholding an image of the median die based on values of the intensity histogram of the median die.

4. The method of claim 3, wherein the values are less than 10%, less than 25%, less than 50%, more than 75%, and more than 90% intensity.

5. The method of claim 3, wherein the one or more segmentation types includes subtracting the median die from each of the die images to generate a set of difference dies, and calculating one or more principal components of the set of difference dies.

6. The method of claim 1, wherein the set of metrics includes one or more of: a mean of an image, a standard deviation of an image, a mean of a thresholded masked image, a standard deviation of a thresholded masked image, mean of an x-directed masked gradient image, mean of a y-directed masked gradient image, standard deviation of an x-directed masked gradient image, and standard deviation of a y-directed masked gradient image.

7. The method of claim 1, wherein the plurality of wafer images comprises one or more of a blue light image, a red light image, a white light image, a green light image, a dark field image, a bright field image, and a polarized image.

8. The method of claim 1, wherein the steps of receiving wafer images, receiving inspection results, generating segment masks, and applying segment masks are repeated for additional wafer images, and further comprising the step of identifying, using the processor, one or more additional statistically significant combinations of metric, segment mask, and wafer image, based on the die inspection results to enhance the detection model.

9. A method for detecting non-compliance of a process, comprising:
    receiving a pre-determined model capable of detecting a process non-compliance, wherein the model is based on combinations of metrics of masked die images and the model comprises a set of significant combinations of segment mask, metric, and wafer image;
    receiving a wafer image comprising a set of die images;

masking the wafer image using a segment mask of the model, wherein the segment mask is configured to mask noise such that only a portion of one of the die images is shown;

calculating a metric of the masked image based on a corresponding combination of segment mask and metric from the model;

repeating the steps of masking the wafer image and calculating a metric based on each combination of segment mask and metric from the model; and determining a process status based on the calculated metrics and the model to detect a compliance or non-compliance status of the process.

10. A device for detecting process non-compliance, comprising:

a processor;

a storage device in electronic communication with the processor;

a communication port in electronic communication with the processor;

wherein the processor is programmed to:

receive, at the communication port, a plurality of wafer images of a wafer, each wafer image of the plurality of wafer images comprising a set of die images;

receive, at the communication port, an inspection result of each die corresponding to the set of die images;

generate a set of segment masks, the segment masks based on the die images of each set of die images and one or more segmentation types, wherein each segment mask is configured to mask noise such that only a portion of one of the die images is shown;

apply each segment mask to each die image to create a masked die image, and calculating a set of metrics for each masked die image;

generate a result wafer image for each combination of wafer image, segment mask, and metric, wherein each result wafer image comprises a set of result die images for the corresponding combination; and identify statistically significant combinations based on the result wafer images and the die inspection results to generate a detection model.

11. The device of claim 10, wherein the processor is further programmed to:

repeat each program step for additional wafers; and refine the generated detection model according to the statistically significant combinations for each wafer.

12. The device of claim 10, wherein the plurality of wafer images of a wafer comprises one or more of a blue light image, a red light image, a white light image, a green light image, a dark field image, a bright field image, and a polarized image.

* * * * *